United States Patent [19]

Saito et al.

[11] Patent Number: 5,390,829
[45] Date of Patent: Feb. 21, 1995

[54] LIQUID INJECTION CONTAINER WITH FINGER KNOB

[75] Inventors: Tadao Saito, Adachi; Takamitsu Nozawa, Suginami; Kazunori Hashimoto, Koto, all of Japan

[73] Assignee: Yoshino Kogyosho Co. Ltd., Tokyo, Japan

[21] Appl. No.: 246,366

[22] Filed: May 18, 1994

Related U.S. Application Data

[63] Continuation of Ser. No. 910,272, Aug. 6, 1992, abandoned.

[30] Foreign Application Priority Data

May 15, 1989 [JP] Japan .................. 1-55473
Nov. 21, 1989 [JP] Japan .................. 1-135213
Nov. 24, 1989 [JP] Japan .................. 1-136461
Nov. 29, 1990 [JP] Japan .................. 2-128985

[51] Int. Cl.6 .................................... G01F 11/00
[52] U.S. Cl. .................................... 222/321
[58] Field of Search .................. 222/321, 324, 385; 239/375

[56] References Cited

U.S. PATENT DOCUMENTS

| 92,872 | 7/1869 | Morton | 222/385 |
| 1,612,149 | 12/1926 | Ouimet | 222/321 |
| 2,004,295 | 6/1935 | Rothchild et al. | 222/321 |
| 2,025,846 | 12/1935 | Bernhardt | 222/321 |
| 2,083,058 | 6/1937 | De Weal | 222/321 X |
| 2,088,790 | 8/1937 | Huthsing | 222/321 |
| 2,096,227 | 10/1937 | De Weal | 222/321 |
| 2,103,932 | 12/1937 | Bernhardt | 222/321 |
| 2,605,019 | 7/1952 | Cornelius | 222/385 |
| 2,846,124 | 8/1958 | Stewart et al. | 222/321 |
| 3,228,571 | 1/1966 | O'Donnell et al. | 222/321 |
| 4,071,173 | 1/1978 | Horan | 222/321 |
| 4,144,987 | 3/1979 | Kishi | 222/321 |
| 4,157,774 | 6/1979 | Micallef | 222/321 |

FOREIGN PATENT DOCUMENTS

| 122942 | 12/1946 | Australia . |
| 201518 | 12/1954 | Australia . |
| 6753424 | 7/1968 | Germany . |
| 58-149372 | 10/1983 | Japan . |
| 58-49685 | 11/1983 | Japan . |
| 60-129364 | 8/1985 | Japan . |
| 63-94181 | 6/1988 | Japan . |
| 64-2758 | 1/1989 | Japan . |
| 686891 | 2/1953 | United Kingdom ............ 222/385 |

Primary Examiner—Andres Kashnikow
Assistant Examiner—Anthoula Pomrening
Attorney, Agent, or Firm—Oliff & Berridge

[57] ABSTRACT

Herein disclosed is a liquid injection container which comprises: a container body 1; a cylinder 10 depending into the container body from a cap-shaped member 3 fitted on the outer face of the mouth/neck portion of the container body; and an actuator 20 having a stem 17 erected through the top wall 4 of the cap-shaped member from a cylindrical piston 16, which is fitted in the cylinder, and a head 18 fitted on the upper end of the stem and having a nozzle opened forward. The actuator is moved up and down with respect to the cylinder for sucking a liquid in the container body into the cylinder and discharging the liquid in the cylinder out of the nozzle 19 through the stem. A finger knob 30 attached to the top face of the head for receiving a finger. The vertical movements of the actuator are accomplished by the tip of the finger inserted into the finger knob. The actuations of the actuator are facilitated by means of auxiliary walls 6 and 6 acting as a finger knob and guiding the head. These auxiliary walls are erected along the righthand and lefthand two side portions of the head.

4 Claims, 11 Drawing Sheets

5,390,829

LIQUID INJECTION CONTAINER WITH FINGER KNOB

This is a continuation of U.S. patent application Ser. No. 07/910,272, filed Aug. 6, 1992, now abandoned.

TECHNICAL FIELD

The present invention relates to a manual type liquid injection container such as a spraying container, a foaming container or a container for discharging a liquid as it is, and a container capable of injecting one of spray, foam and liquid selectively by switching a liquid injection passage formed in a head.

BACKGROUND ART

As the manual type spraying container, a foaming container or a container for injecting a liquid as it is, there is commercially sold a liquid injection container which comprises: a container body; a cylinder depending into the container body from a cap-shaped member fitted on the outer face of the mouth/neck portion of the container body; and an actuator having a stem erected through the top wall of the cap-shaped member from a cylindrical piston, which is fitted in the cylinder, and a head fitted on the upper end of the stem and having a nozzle opened forward. The actuator is moved up and down with respect to the cylinder for sucking a liquid in the container body into the cylinder and discharging the liquid in the cylinder out of the nozzle through the stem. Also sold is a container which is enabled to inject one of those spray, foam and liquid selectively by switching a liquid injection passage formed in the head.

Incidentally, these containers have different nozzle structures but are substantially similar except the structure of the head having the nozzle.

In the aforementioned liquid injection containers of the prior art, the actuator composed of the cylindrical piston, the stem and the head is biased upward by the spring so that it is raised back by the spring after it has been depressed. As a result, the depression of the actuator is accomplished against the biasing force of the spring so that it requires a considerable force.

The present invention contemplates to provide a liquid injection container, from which the spring is eliminated and in which the finger knob is added to the top face of the head of the actuator, so that the actuator may be moved up and down by the finger inserted into the finger knob. These actuations are facilitated by erecting auxiliary walls along the two sides of the head of the actuator for acting as a finger grip and guiding the head.

DISCLOSURE OF THE INVENTION

In an elevated state of the actuator 20, as shown in FIGS. 1, 6 and. 8, the finger tip of a hand holding the upper portion of the container is slightly inserted into the finger knob 30 and is pulled up and down so that the actuator 20 composed of the cylindrical piston 16, the stem 17 and the head 18 is moved up and down to suck the liquid in the container into the cylinder 10 and to discharge the liquid in the cylinder out of the nozzle 19 of the head 15. The auxiliary walls 6 and 6 of FIG. 8, which are erected along the righthand and lefthand side portions of the top wall of the cap-shaped member, partly provide a finger grip, when the container is held at its upper portion by the hand, and partly guide the head 18 when the head is moved down, to prevent the head from moving to the right and left.

BRIEF DESCRIPTION OF DRAWINGS

Of FIGS. 1 and 2 showing a first embodiment.

BEST MODE FOR CARRYING OUT THE INVENTION

Figure 1:
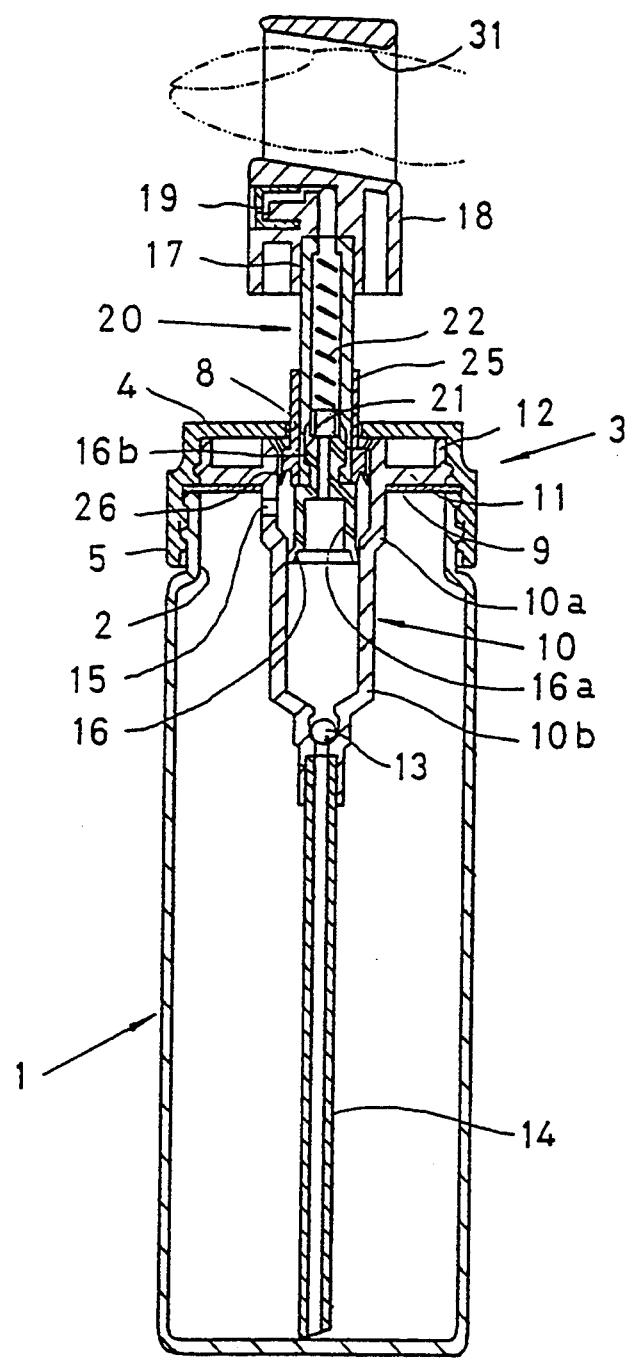
FIG. 1 is a longitudinal section showing a container of the present invention.

First of all, the first embodiment shown in FIGS. 1 and 2 will be described in the following. Reference numeral 1 designates a container body having an erected mouth/neck portion 2. On the outer face of the mouth/neck portion, there is screwed the lower half of a circumferential wall 5 which depends from the outer circumference of the top wall of a cap-shaped member 3. Said member is formed with a hole 8 at the central portion of the top wall 4. The upper half of the circumferential wall is radially reduced to have a smaller internal diameter than the external diameter of the mouth/neck portion, and the reduced portion has its lower end face mounted through a packing 9 on the upper end face of the mouth/neck portion.

In the upper half of the aforementioned circumferential wall 5, there is fitted a short cylinder 12 which is erected from the outer circumference of an external flange 11 formed in the upper portion of a cylinder 10. This cylinder 10 has a larger-diameter portion 10a at its upper portion and a smaller-diameter portion 10b at its lower portion and is equipped in the inner face of its lower end with a suction valve 13 of a ball valve. A pipe 14 depends to the bottom portion of the container body from the lower end of the cylinder 10. An air vent hole 15 is formed in the aforementioned larger-diameter portion 10a.

From the inside of the aforementioned cylinder 10, there is erected through the aforementioned hole 8 a stem 17 which is equipped with a cylindrical piston 16 at its lower end. On the upper end of said stem, there is fitted a head 18 which has a nozzle 19 opened forward. The cylindrical piston 16 and the stem 17 may be made of different members, as shown. In the shown embodiment, the cylindrical piston has its smaller-diameter cylindrical portion 16b erected from the upper end of its cylinder portion 16a through an inward flanged portion and fitted in the lower portion of the stem 17. The cylindrical piston 16, stem 17 and head 18 constitute altogether an actuator 20, which is equipped with a discharge valve. This discharge valve is formed, in the shown embodiment, by fitting a valve member 21, which has longitudinal grooves in its outer face, vertically movably in the stem 17 so that it is defined by the lower end face of said valve member and the upper end of the bore of the aforementioned smaller-diameter cylinder portion. The valve member 21 is biased downward by a spring 22 which is fitted in the stem. This spring has its upper end engaging with the lower face of the inward flange formed at the upper end of the stem. On the outer face of the lower portion of the stem 17, there may be fitted a sliding cylinder 25, which has its lower portion formed on its outer circumference with a ring-shaped sealing member 26 fitted in the cylinder larger-diameter portion 10a and which has its lower end engaging with the upper end face of the cylinder portion of the cylindrical piston 16. As shown in FIG. 2, said sliding cylinder is moved down together with the stem 17 by depressing the head 18, until it is stopped when said sealing member has its lower end contacting with the upper end of the cylinder smaller-diameter portion 10b so that the sealing member 26 shuts out the air vent hole 15. However, the stem 17 is further moved down with respect to the sliding cylinder 25. When the stem is to be moved up, on the other hand, the cylindrical piston has its cylinder portion 16a contacting with the lower end of the sliding cylinder 25 to push up said slider cylinder. If the container has its inside evacuated as the liquid decreases, the sealing member 26 is moved upward of the air vent hole 15. After this, the ambient air is introduced into the container body through the clearance between the inner edge of the hole 8 and the outer face of the sliding cylinder 25, through the clearance which is established between the sealing member 26 and the inner face of the larger-diameter portion of the cylinder by deforming said sealing member 26 elastically, and through the air vent hole 15. In the shown embodiment, the nozzle opened in the front face of the head is used for atomizations. Despite of this fact, however, there can be provided a foaming container or a liquid discharge container either, as is well known in the art, by changing the nozzle structure into a foaming one or by making a head for injecting a liquid as it is. To the upper face of the head 18, there is attached a ring-shaped finger knob 30 which has its ring hole directed forward or backward. Said finger knob is sized to admit the finger tip into the ring-shaped portion. Said finger knob 30 has its finger hole 31 opened forward or backward.

Figure 3:
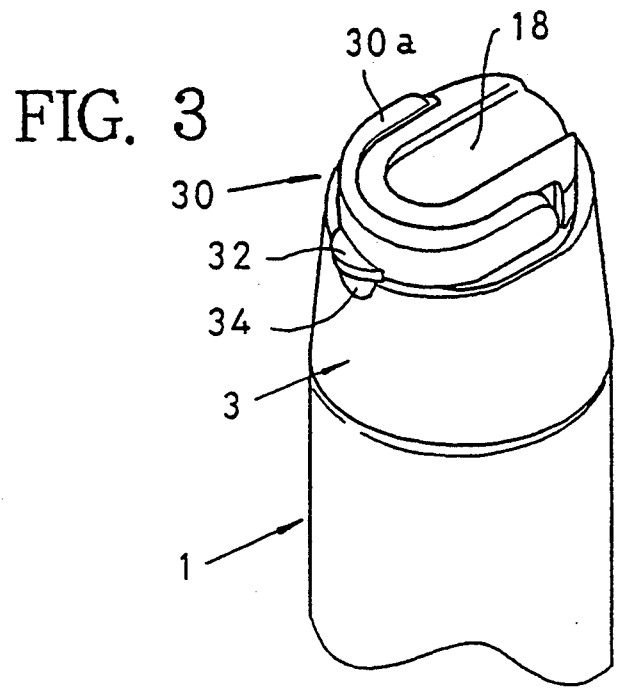
FIG. 3 is a perspective view showing the state, in which a U-shaped bail forming a finger knob is fallen down forward.
Figure 4:
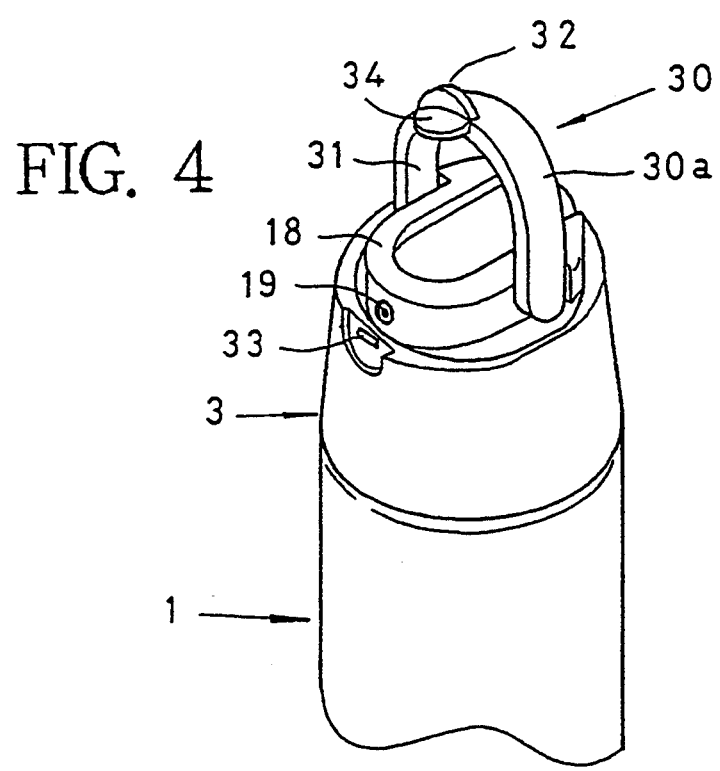
FIG. 4 is a perspective view showing an erected state. Of FIGS. 5, 6 and 7 showing a third embodiment.

Next, the following description is directed to the second embodiment shown in FIGS. 3 and 4.

Said embodiment is formed by hinging the righthand and lefthand two end portions of a U-shaped bail 30a of the finger knob 30 to the righthand and lefthand two side faces of the head 18 such that the finger knob 30 can be turned up and down. When the U-shaped bail 30a is erected, the finger hole 31 is formed by the upper face of the head 18 and the inner face of the U-shaped bail 30a. When the U-shaped bail is fallen down forward, it shuts out the front face of the nozzle 19. As shown, the U-shaped bail 30a may preferably be formed at its intermediate portion with an operation projection 32. Moreover, the upper end portion of the front face of the circumferential wall of the cap-shaped member 3 and the U-shaped bail 30a are respectively formed with a projection 33 for locking the U-shaped bail in its forward fallen position and an engagement member 34 for engaging with said projection.

Figure 5:
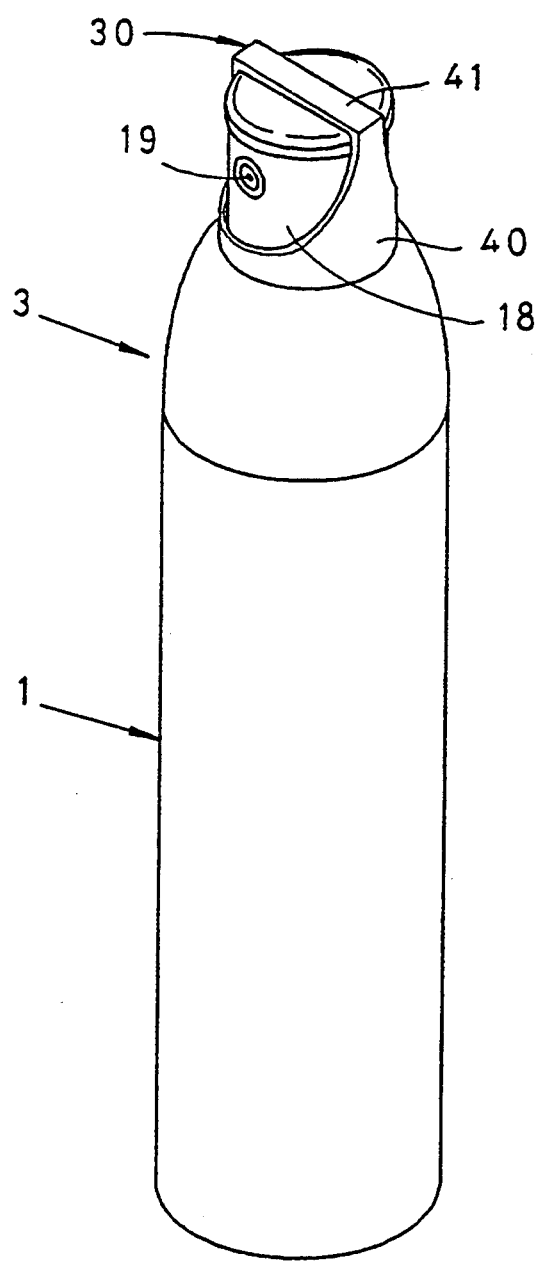
FIG. 5 is a perspective view showing the state, in which an inverted U-shaped bail forming the finger knob is in a lower position.
Figure 6:
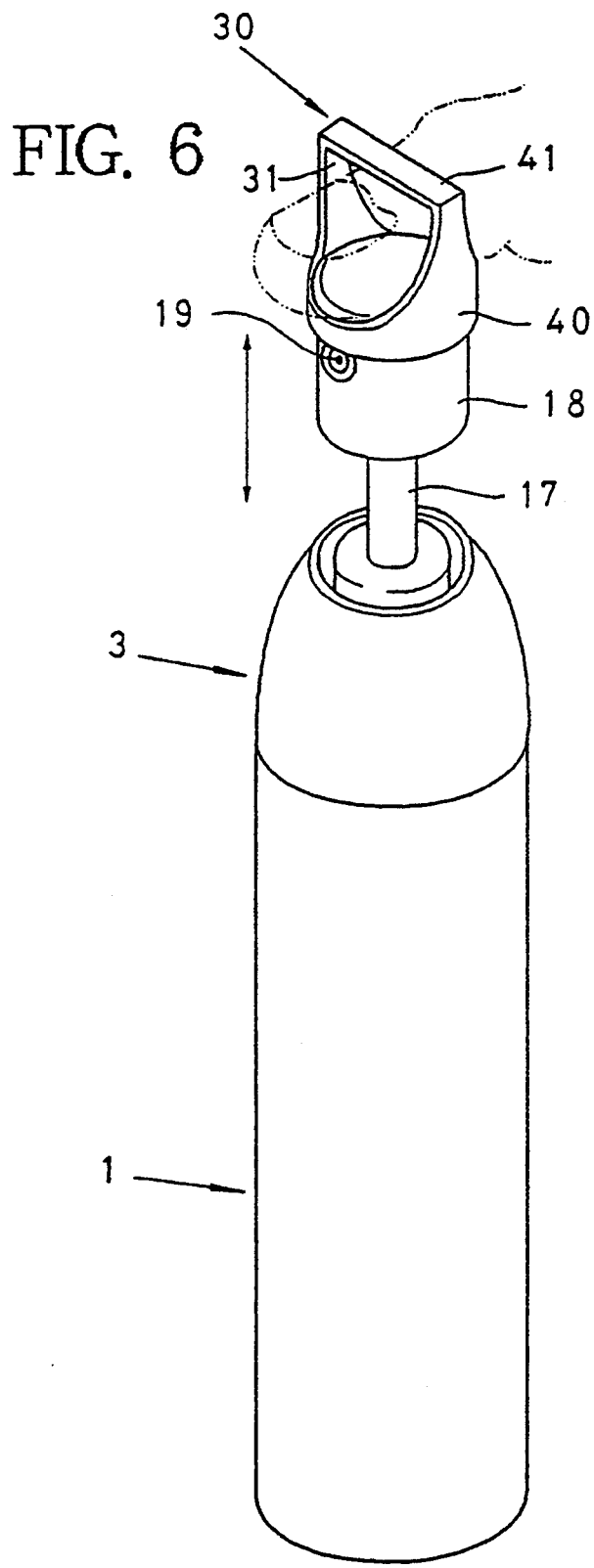
FIG. 6 is a perspective view showing the state, in which the inverted U-shaped bail is pulled up to carry the head upward.
Figure 7:
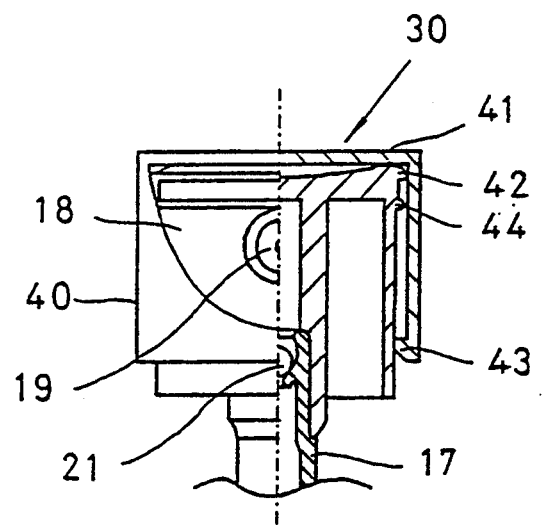
FIG. 7 is an enlarged elevation showing an essential portion half in section with the inverted U-shaped bail being in the lower position. Of FIGS. 8 to 10 showing a fourth embodiment.

In the third embodiment shown in FIGS. 5, 6 and 7, said finger knob 30 is formed of an inverted U-shaped bail 41 which is erected from the righthand and lefthand two sides of a sliding cylinder 40 fitted vertically movably on the outer face of the head 18. The outer end of the head 18 and the lower end of the sliding cylinder 40 are formed at their respective outer and inner circumferences with first and second engagement ridges 42 and 43. Slightly below the first engagement ridge 42 of the head, as shown in FIG. 7, there may be formed a third engagement ridge 44 which is given such a slightly smaller external diameter than that of the first engagement ridge 42 as to allow the second engagement ridge of the sliding cylinder to forcibly ride thereover. Then, the sliding cylinder 40 can be prevented from automatically moving down, when it is pulled up, so long as the inverted U-shaped bail 41 is not depressed while leaving the second engagement ridge 43 positioned between the third engagement ridge 44 and the first engagement ridge 41. In this embodiment, the discharge valve of the first embodiment is replaced by one which is formed of a ball valve 21a disposed in the upper end portion of the stem 17.

Figure 2:
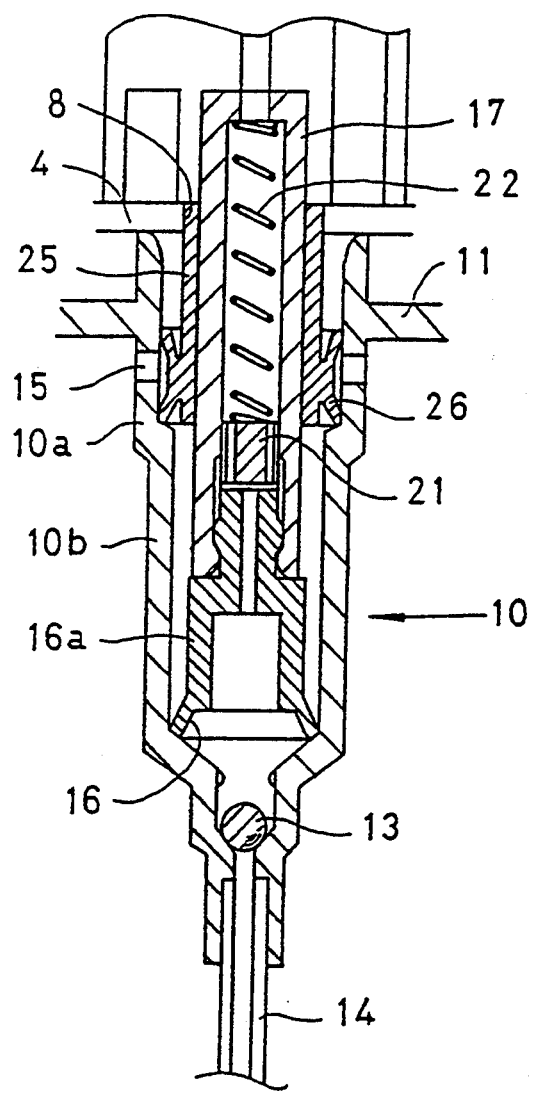
FIG. 2 is an enlarged section showing an essential portion of FIG. 1 with an actuator being in a lower position. Of FIGS. 3 and 4 showing a second embodiment.
Figure 8:
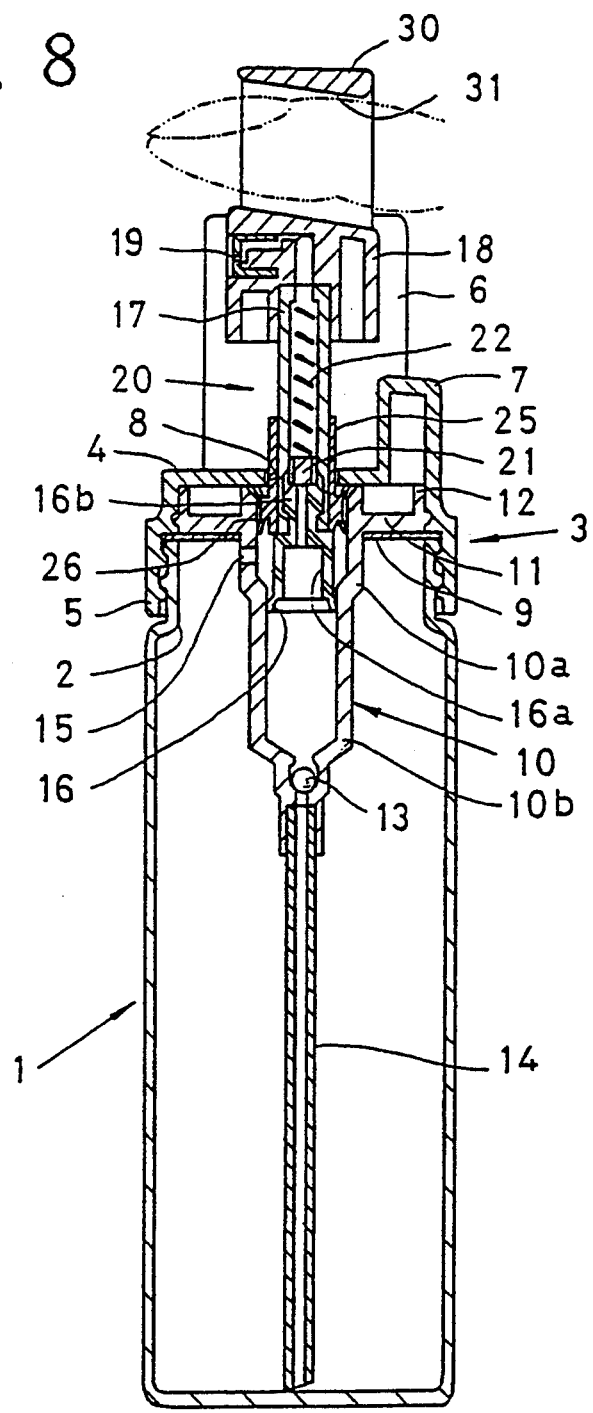
FIG. 8 is a longitudinal section showing a container.
Figure 9:
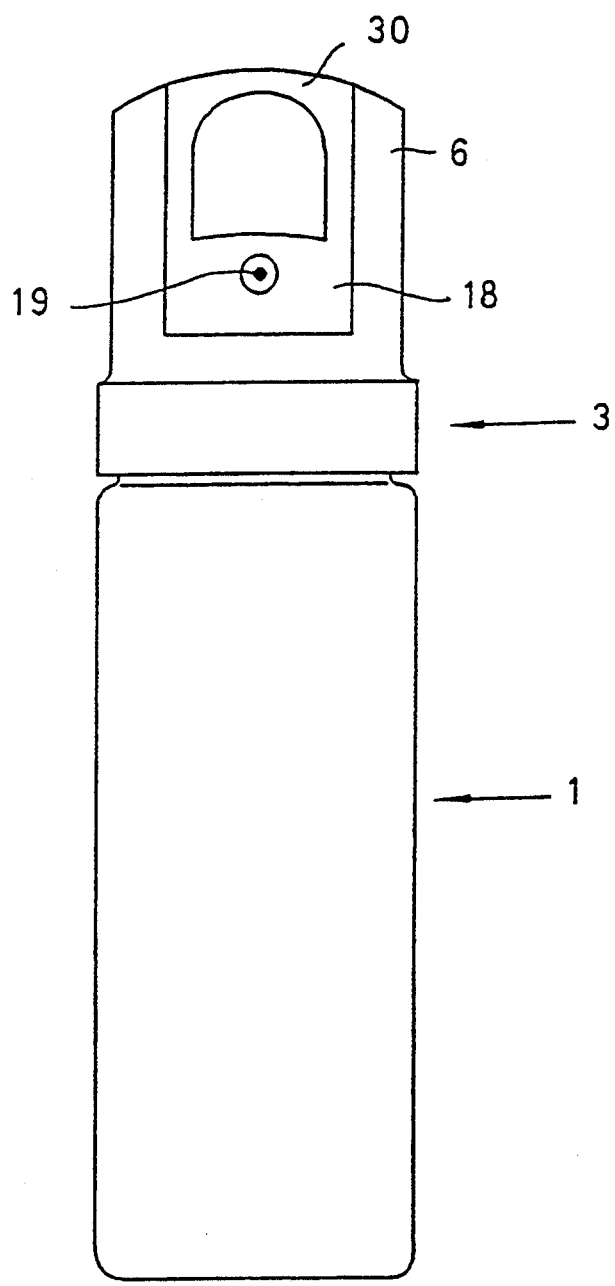
FIG. 9 is a front elevation showing the container.
Figure 10:
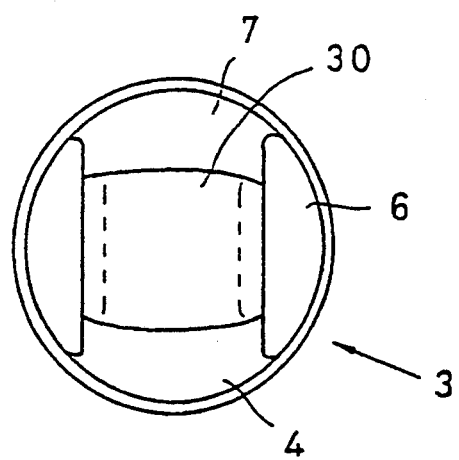
FIG. 10 is a top plan view showing the container.
Figure 11A:
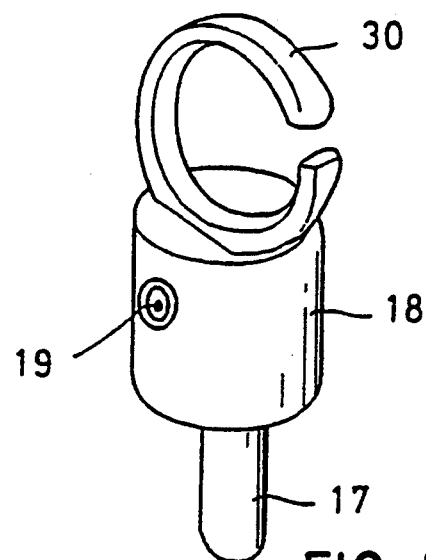
FIG. 11 shows respective modifications of the finger knob at A, B, C, D and E.
Figure 11B:
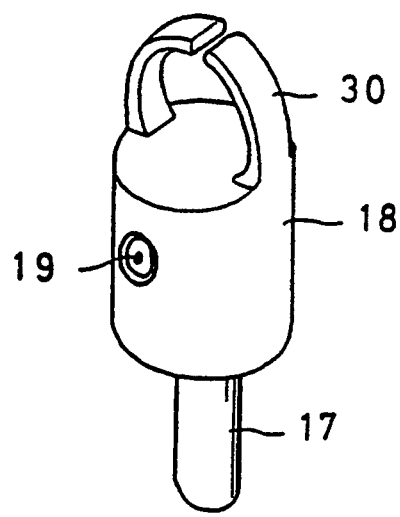
Figure 11C:
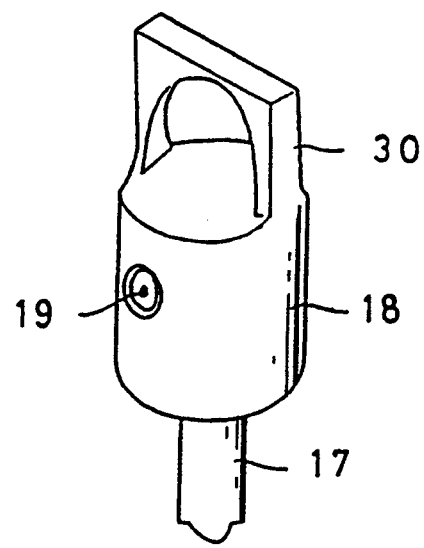
Figure 11D:
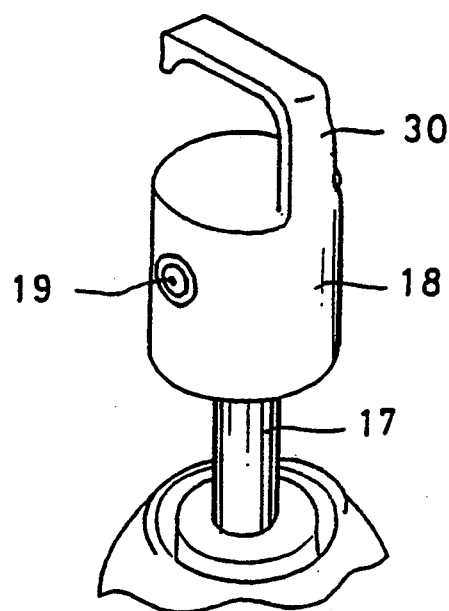
Figure 11E:
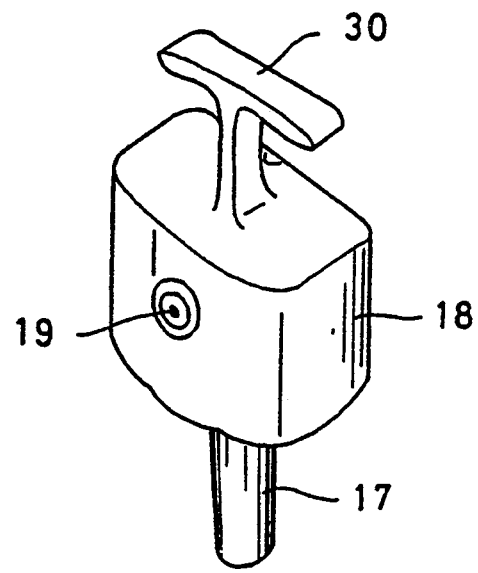

In the embodiment shown in FIGS. 8 to 10, auxiliary walls 6 and 6 for acting as the finger grip and guiding the head are erected from the righthand and lefthand two portions of the top wall 4 of the cap-shaped member 3 of FIG. 1, and a rear wall 7 for connecting the rear portions of the lower halves of those auxiliary walls is erected from the rear portion of the top wall. In this embodiment, the head 18 is formed generally into such a square shape that it can be moved up and down while having its righthand and lefthand side faces contacting with the inner faces of the auxiliary walls 6 and 6.

These auxiliary walls 6 and 6 can be addled to the respective cap-shaped members 3 of the second embodiment shown in FIGS. 3 and 4 and the third embodiment shown in FIGS. 5, 6 and 7.

The finger knob 30 can be conceived to have a variety of shapes, as shown at A, B, C, D and E in FIG. 11, in addition to those of the foregoing embodiments. The finger knob has a shape of letter C at A in FIG. 11, a shape, in which arcuate members are projected upward and inward from the righthand and lefthand side faces of the head 18 to have their upper ends adjacent to each other, at B in FIG. 11, a shape of inverted letter U at C in FIG. 11, a shape of inverted letter L at D in FIG. 11, and a shape of letter T at E in FIG. 11. In ease of the finger knob of said shape of letter T, the rising portion may be pinched and moved up and down by two fingers.

INDUSTRIAL APPLICABILITY

With the structure thus far described, according to the present invention, the spring for pushing up the actuator of the liquid discharge container of the aforementioned example of the prior art is eliminated to make the force unnecessary for compressing the spring at the time of depressing the actuator so that the actuator can be depressed by a less force than that of the prior art. Since, moreover, the finger knob is attached to the upper face of the head, the actuator can be easily moved up and down by having the finger knob hooked by the finger tip of the hand holding the container.

Because of the absence of the actuator depressing spring, still moreover, the actuator can be stopped in its lower position, when the container is not used, so that the container can be made lower and more compact than that of the prior art. Since, furthermore, the finger knob 30 is attached to the upper face of the head, the finger on the head can be set in a constant position so that the position of the finger knob on the head can be made proper. As a result, the head can always be depressed substantially vertically unlike the prior art while being prevented from being pushed transversely or from the back, so that the liquid can be prevented from leaking otherwise due to the transverse push or the push from the back.

As defined in claim 2, moreover, the finger knob has the U-shaped bail having its two end portions so hinged to the righthand and lefthand two side faces of the head that it can stand up to define the finger hole with the top face of the head and the inner face of the U-shaped bail and can fall down to shut out the front face of the nozzle with the inner face of the U-shaped bail. As a result, the nozzle can be kept away from dust or the like so that it can be prevented from getting clogged.

As defined in claim 3, the finger knob has the inverted U-shaped bail erected from the righthand and lefthand two sides of the sliding cylinder, which is fitted vertically slidably on the outer face of the head. As a result, the upper portion of the finger knob can be positioned, while the container is unused, in the vicinity of the upper face of the head because the sliding cylinder is in the lower position, thus raising an advantage that the overall height of the container can be reduced.

As defined in claim 4, the auxiliary walls acting as the finger grip and guiding the head are so erected from the righthand and lefthand two side portions of the top wall of the cap-shaped member along the righthand and lefthand two side faces of the head as to allow the vertical movements of the head. As a result, the actuator can be operated by gripping the upper portion of the container body and the lower portions of the auxiliary walls when the container is held for operating the actuator. Thus, the grip position of the hand can be made higher than that of the case of no auxiliary wall, to raise the finger tip engaging with the finger knob thereby to increase the stroke of the actuator. Moreover, the head can be prevented from shaking by the guidance of the auxiliary walls, while it is being moved up and down, so that the operation of the actuator can be facilitated.

We claim:

1. A manually-operated liquid discharge container comprising:
   a container body having a neck portion;
   a cap-shaped member including a top wall connected to a circumferential wall fitted on said neck portion;
   a pump cylinder having a suction valve, said pump cylinder extending downwardly from said cap-shaped member into said container body;
   an actuator having a piston arranged slidably in said pump cylinder, a stem extending upwardly from said piston through said top wall, and an operation head attached on a top of said stem and provided with a discharge nozzle having a front face and a generally ring-shaped finger knob with a hole for receiving a finger of a user, said actuator being adapted to suck a liquid from within said container body into said pump cylinder and to discharge the liquid out of said discharge nozzle in a direction by vertical movement of said piston; and
   a pair of auxiliary walls extending upwardly from said top wall along opposed side surfaces of said operation head for protecting and guiding said operation head through a gap therebetween, said auxiliary walls also serving as grips for fingers of a user,
   wherein said piston is free from automatic upward bias and said finger knob is provided on an upper end of said operation head for manually pulling up and depressing down said piston,
   and said finger knob hole is oriented in the same direction as the discharge from said discharge nozzle and said auxiliary walls are disposed on opposed sides of the stem at generally right angles to the front face of the discharge nozzle.

2. A manually-operated liquid discharge container according to claim 1, wherein a rear wall is provided on said top wall, extending upwardly from said top wall, behind said operation head connecting lower portions of said auxiliary walls.

3. A manually-operated liquid discharge container according to claim 1, wherein said operation head has a rectangular cross-section and said opposed side surfaces are in contact with and slidable over inner faces of said pair of auxiliary walls, to guide and prevent lateral movement of said operation head during vertical movement of said piston.

4. A manually-operated liquid discharge container according to claim 1, wherein said pair of auxiliary walls extend above said discharge nozzle at least when said finger knob is depressed.

* * * * *